July 29, 1930.  F. E. ASHTON  1,771,603
LOOM
Filed Sept. 26, 1928  10 Sheets-Sheet 1

WITNESSES:

INVENTOR:
Francis E. Ashton,
BY
Joshua R. H. Potts
ATTORNEY.

July 29, 1930.　　　　F. E. ASHTON　　　　1,771,603
LOOM
Filed Sept. 26, 1928　　　10 Sheets-Sheet 4

WITNESSES:

INVENTOR:
Francis E. Ashton,
BY
Joshua R. H. Potts
ATTORNEY.

July 29, 1930.  F. E. ASHTON  1,771,603
LOOM
Filed Sept. 26, 1928   10 Sheets-Sheet 5
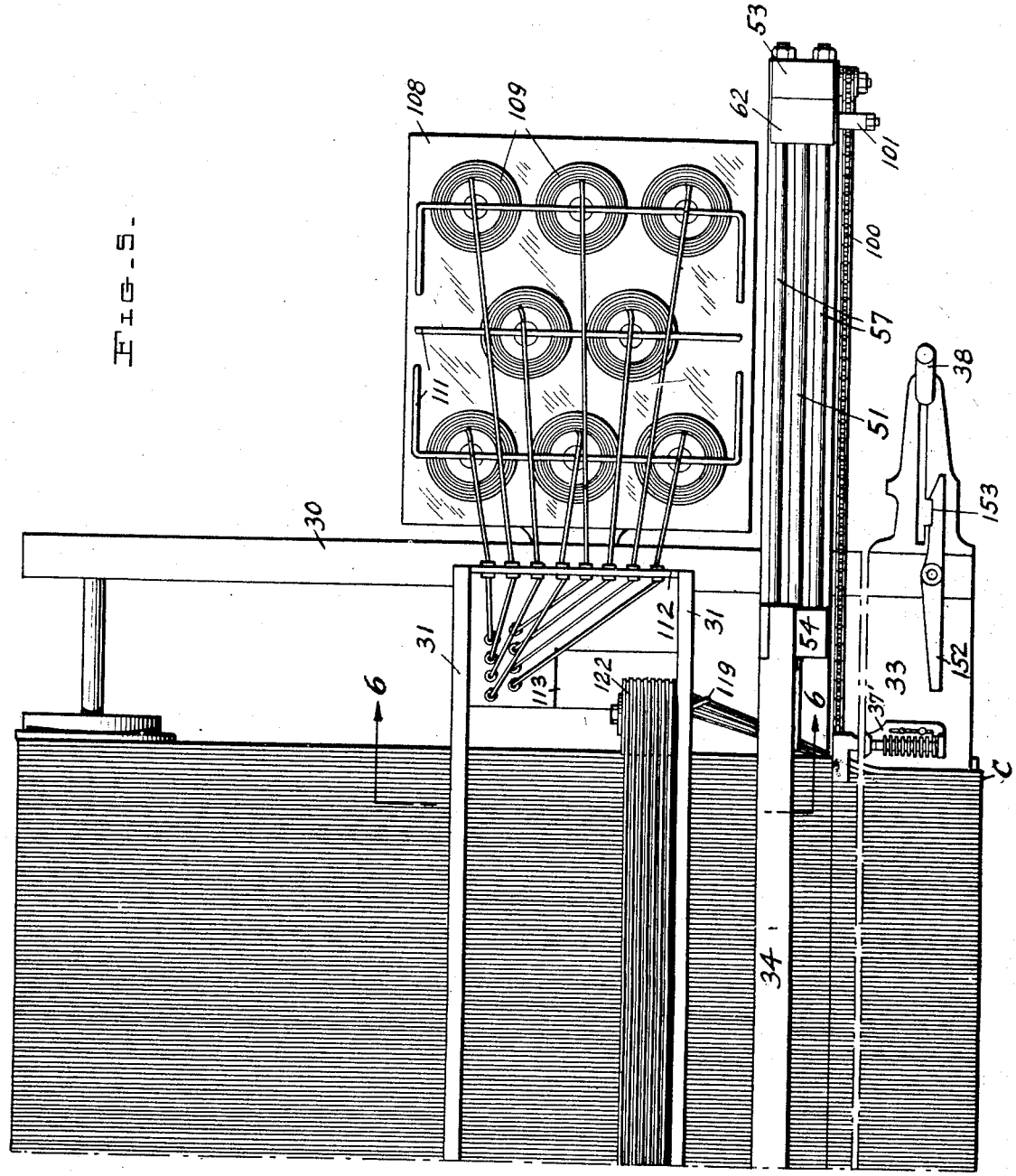
WITNESSES:
Alfred E. Schinger
Evelyn Crompton
INVENTOR:
Francis E. Ashton,
BY
Joshua R. H. Potts
ATTORNEY.

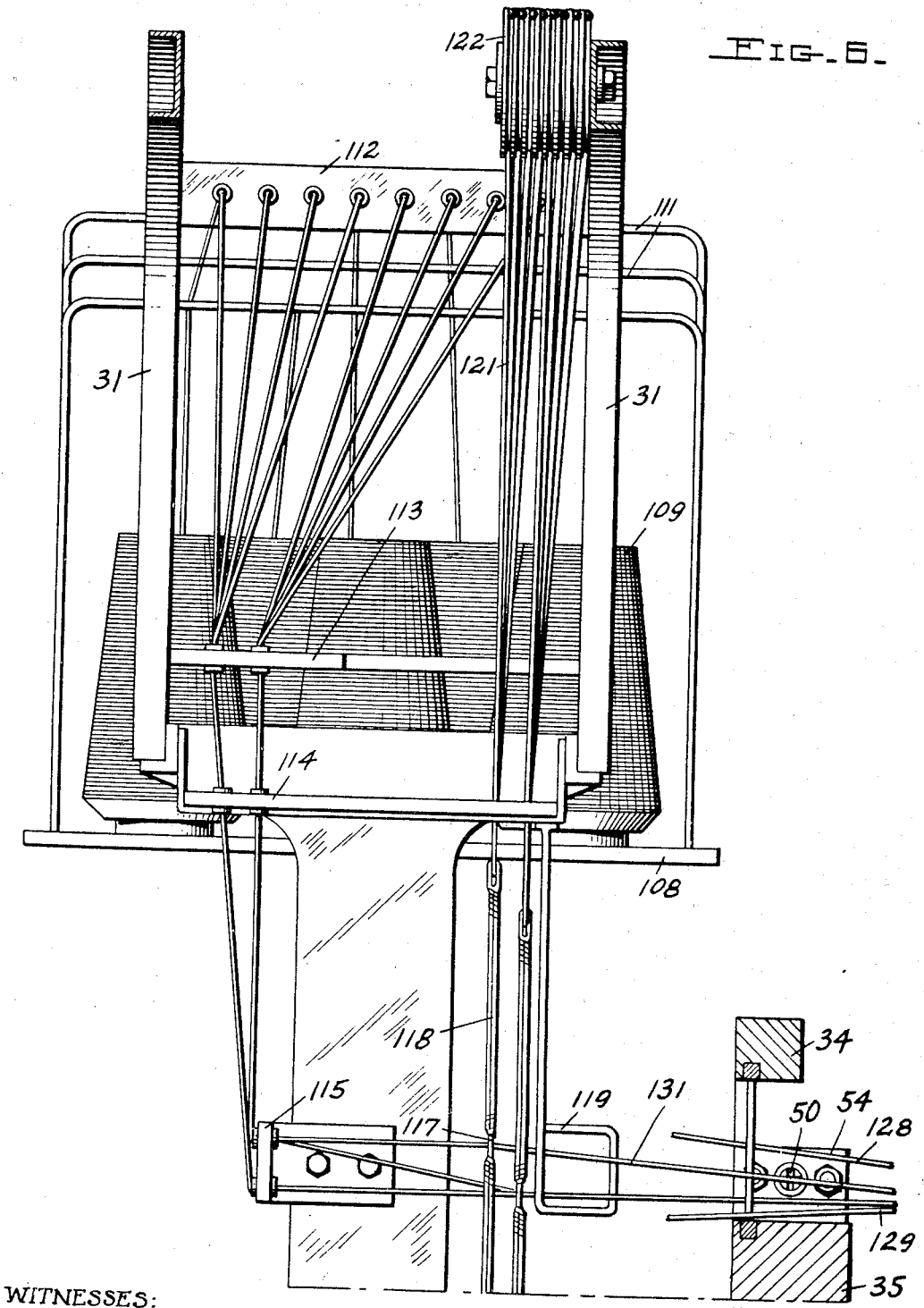

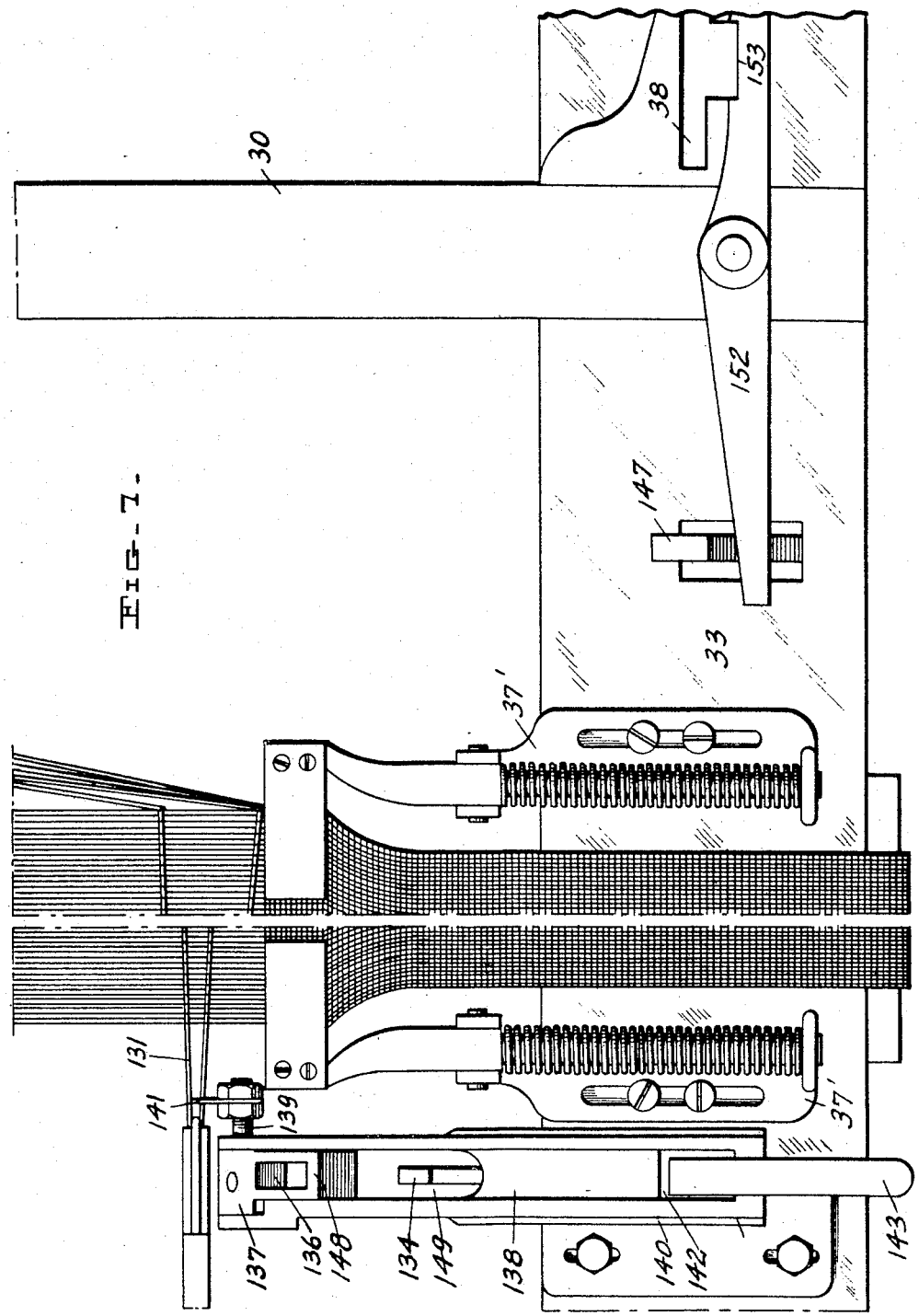

July 29, 1930.  F. E. ASHTON  1,771,603
LOOM
Filed Sept. 26, 1928  10 Sheets-Sheet 8
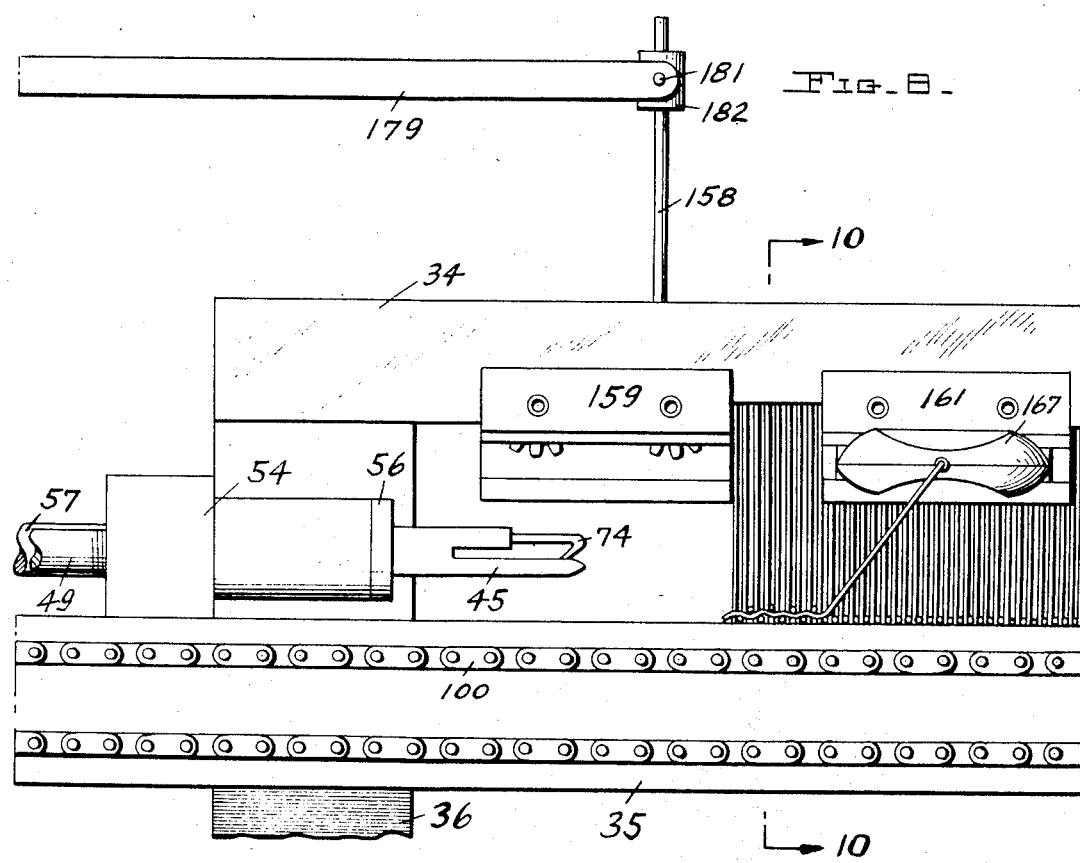
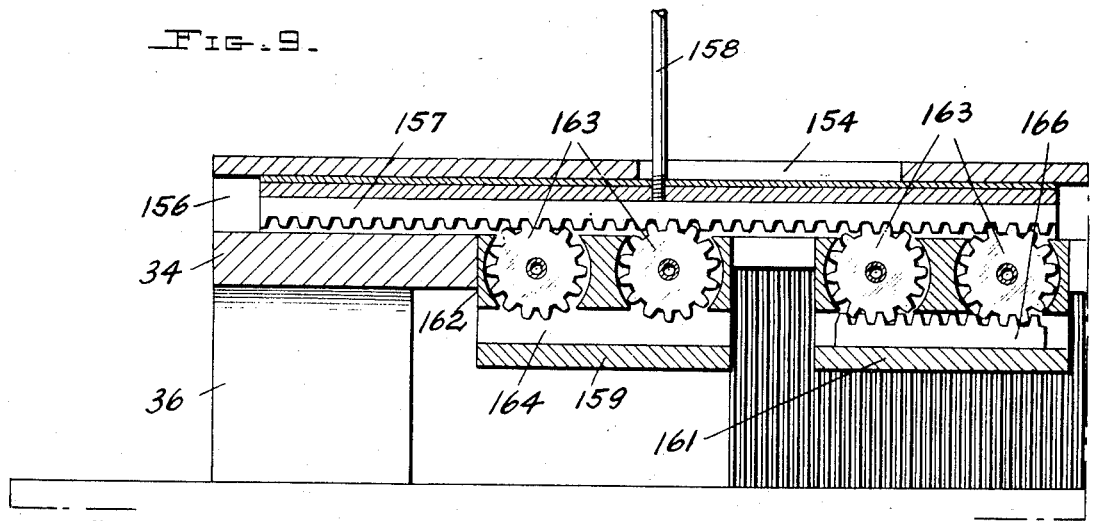

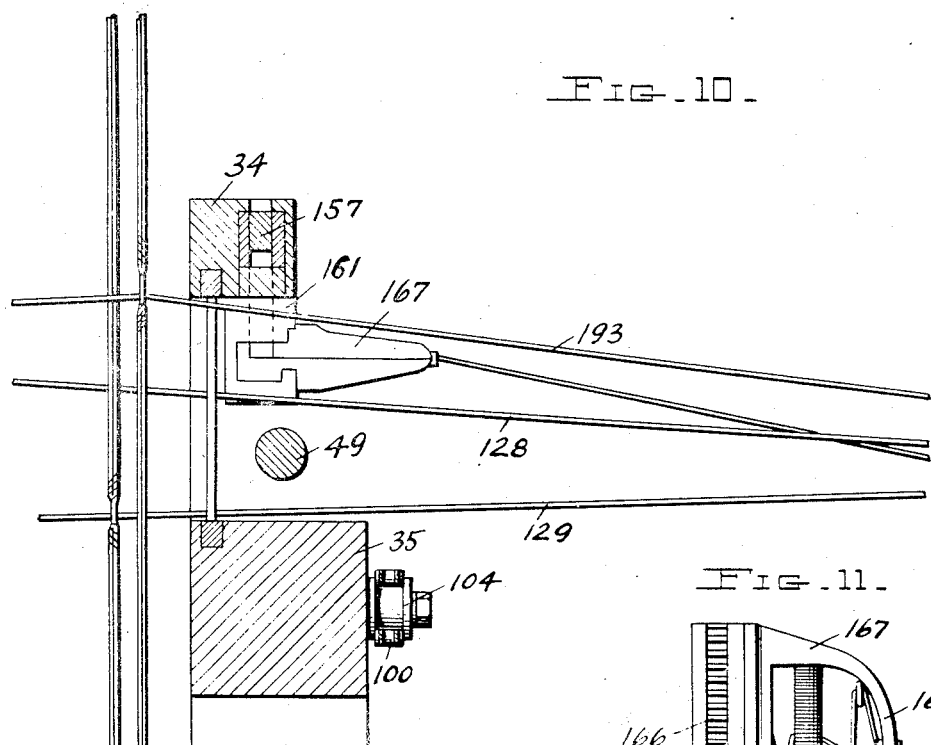
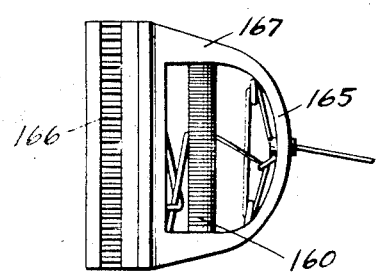
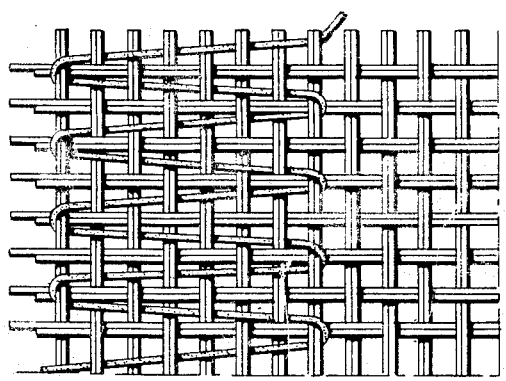

July 29, 1930.  F. E. ASHTON  1,771,603
LOOM
Filed Sept. 26, 1928  10 Sheets-Sheet 10

WITNESSES:
Alfred E. Ischinger
Evelyn Crompton

INVENTOR:
Francis E. Ashton,
BY
Joshua R. H. Potts
ATTORNEY.

Patented July 29, 1930

1,771,603

UNITED STATES PATENT OFFICE

FRANCIS E. ASHTON, OF CHESTER, PENNSYLVANIA, ASSIGNOR TO ABERFOYLE MANUFACTURING COMPANY, OF CHESTER, PENNSYLVANIA, A CORPORATION OF PENNSYLVANIA

LOOM

Application filed September 26, 1928. Serial No. 308,420.

This invention relates to a loom for weaving, and it has particular reference to a loom in which the shuttles, etc., are replaced by a needle and carrier, and more particularly to driving mechanism for the needle and carrier which weave the weft threads through the shed of the warp.

This application includes mechanism which is adapted to be associated with and incorporated in looms of the general type shown and described in my co-pending application, Serial No. 242,342, filed December 24, 1927.

The object of this invention is to provide simplified and more efficient driving mechanism for the needle and carrier.

In the co-pending application above referred to, the loom has the usual warp beam and heddles for producing the warp threads and includes means for positioning a weft thread so that any selected color may be engaged by a carrier which carries the loop thread to the center of the shed where it is received by a needle and carried to the other side of the shed at which point it is cut by suitable cutting means which also acts as a stop mechanism when the weft thread is wanting, also means for actuating the carrier and needle and means for producing selvage edges at the side of the cloth where the weft threads are cut.

According to the present invention, the improved loom above described is provided with improved mechanism for more positively and efficiently operating the parts above described and for better timing the movement of the several parts directly involved in producing the finished woven material.

Figure 1:
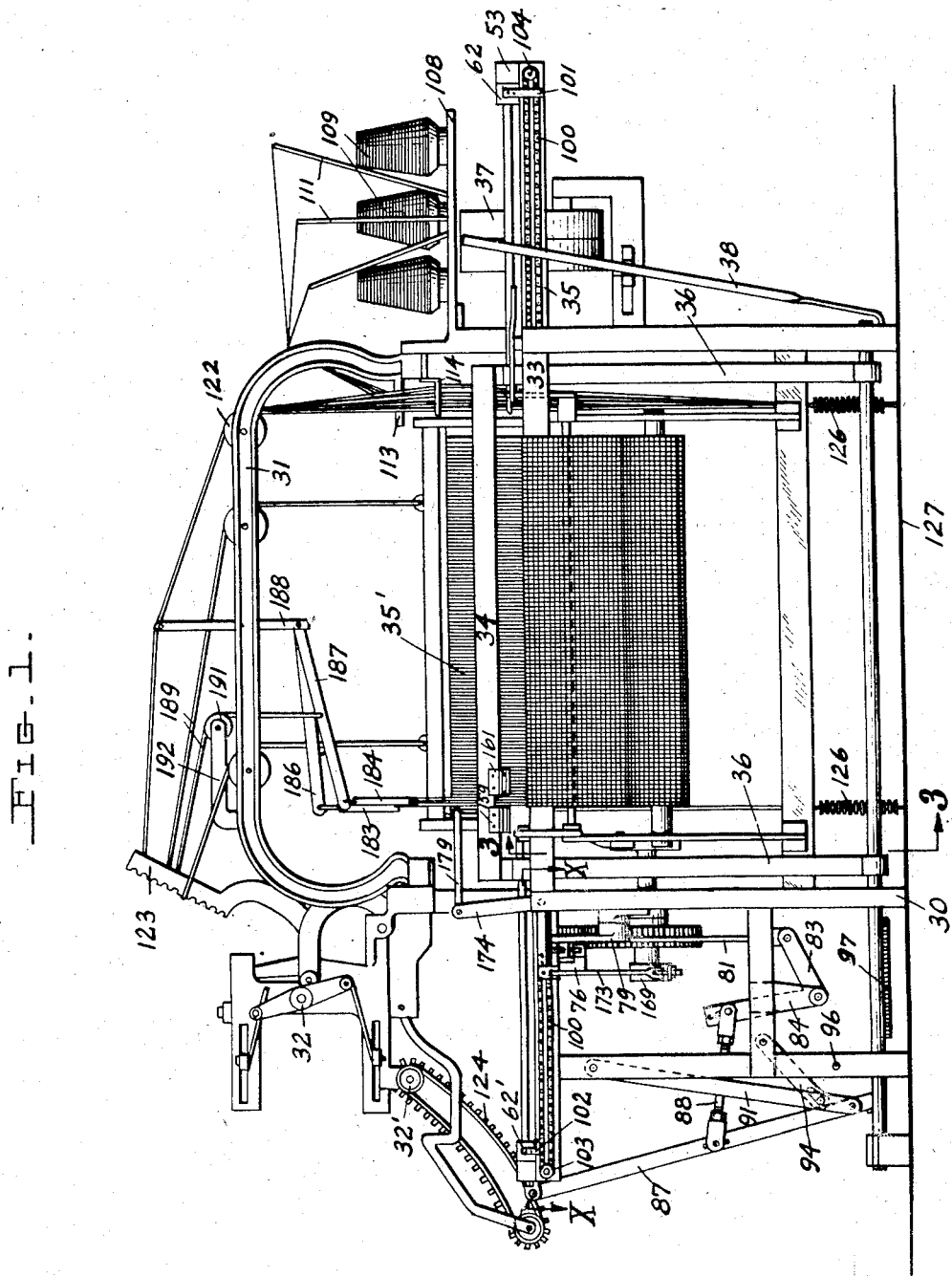
Figure 2:
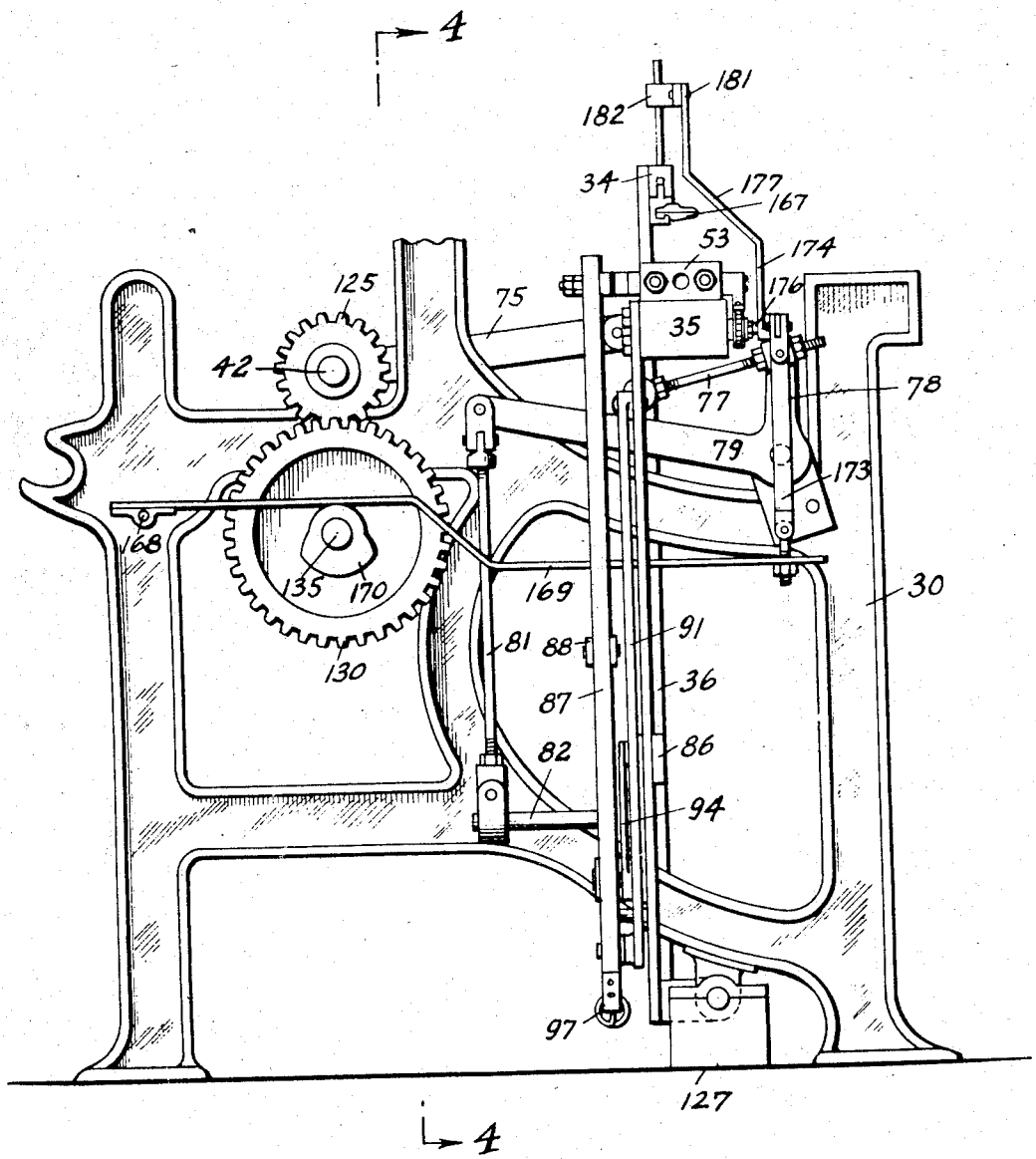
Figure 3:
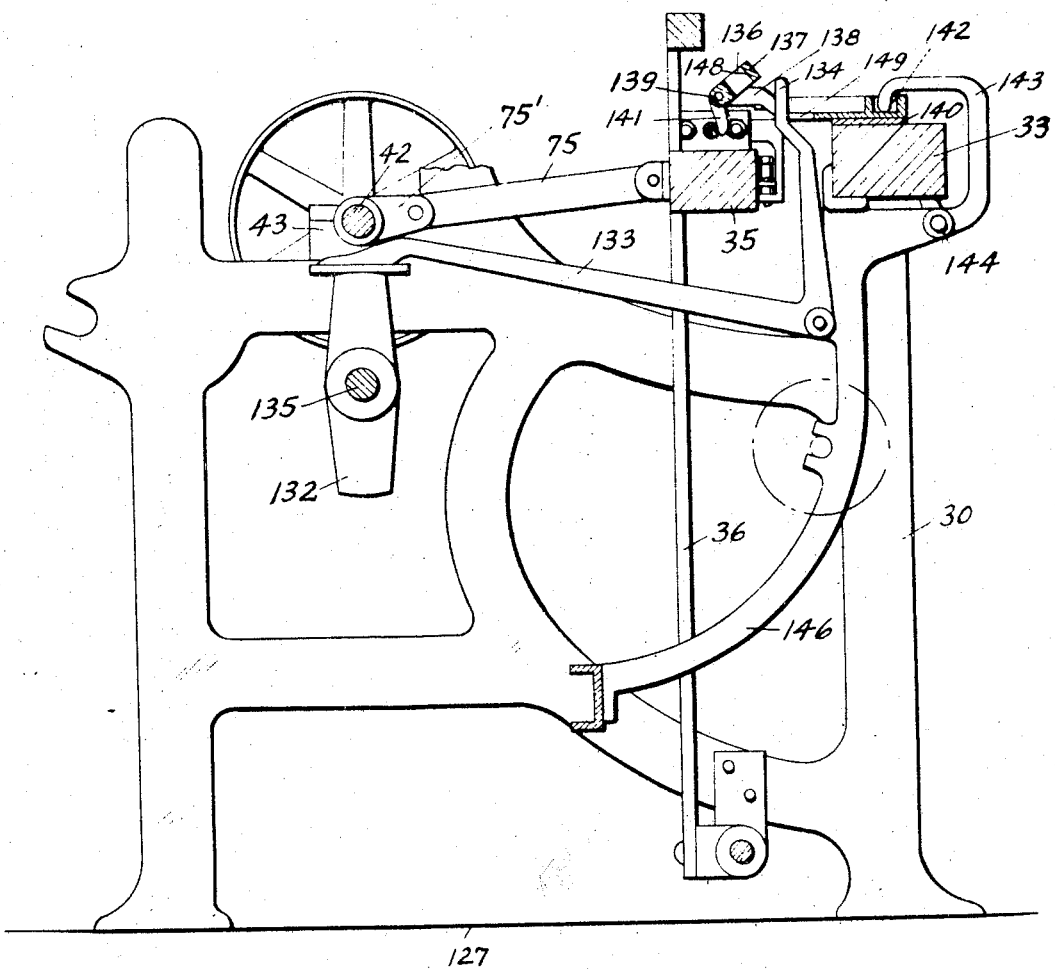
Figure 4:
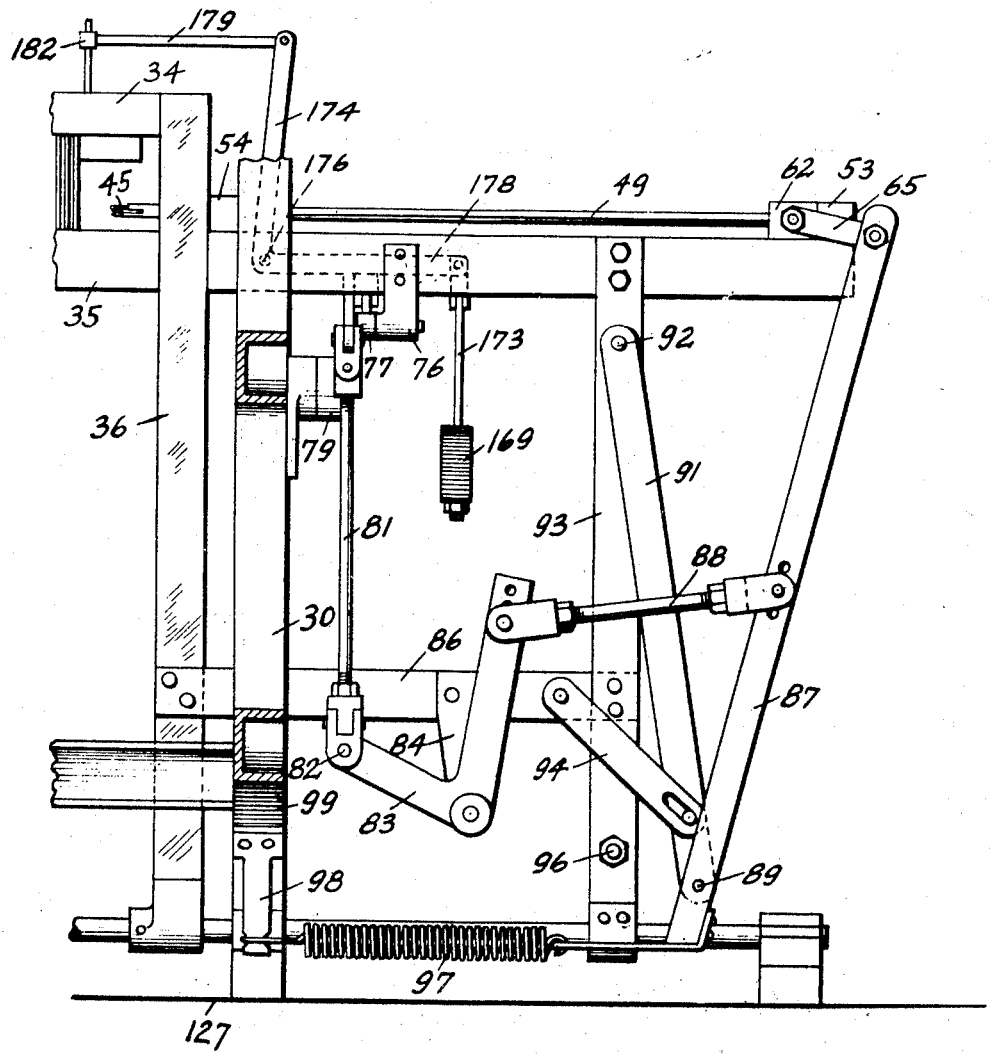
Figure 13:
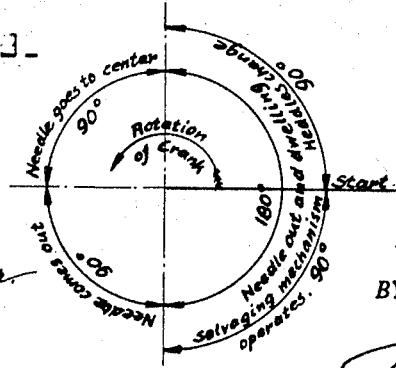
Figure 13:
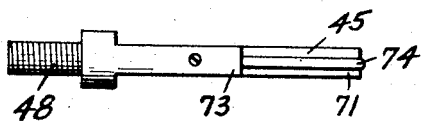
Figure 15:
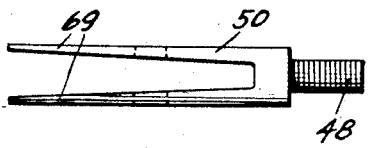
Figure 14:
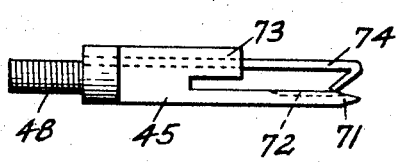
Figure 16:
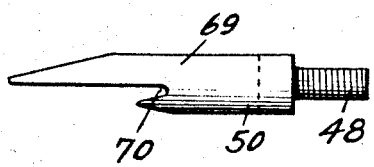
Figure 17:
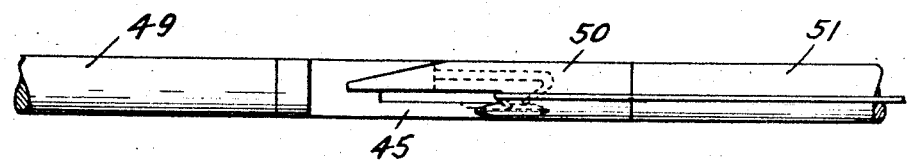
Figure 18:
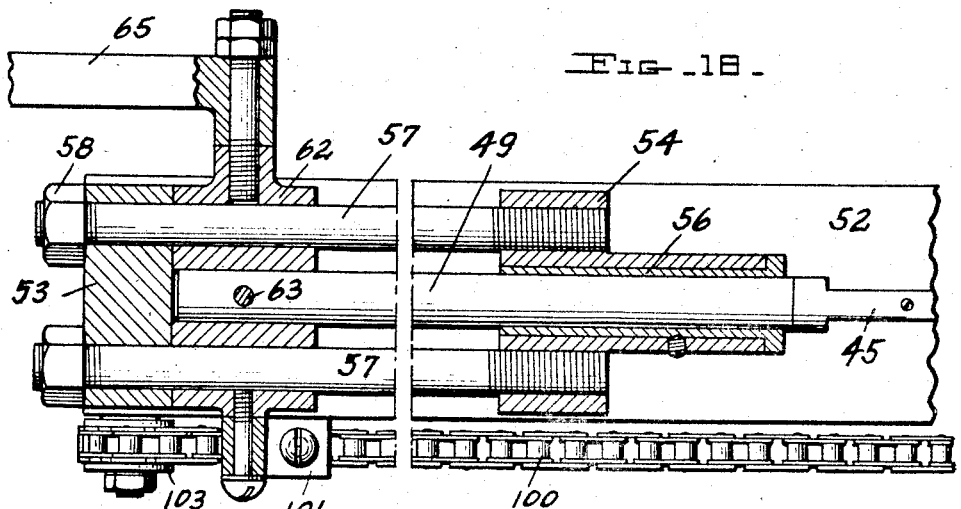

The drawings illustrate an embodiment of the invention and the views therein are as follows:

Figure 1 is a front view of the loom with the improved mechanism incorporated therein, Figure 2 is an elevational view from the left hand end of the loom with the top, pattern, chain, harness and other parts omitted, Figure 3 is a fragmentary vertical section taken on the line 3—3 of Figure 1 and shows the means for severing the weft thread and releasing it from the needle, and the means for stopping the loom when the weft thread is omitted from the shed, Figure 4 is a vertical section on the line 4—4 of Figure 2, Figure 5 is a top plan view of the right side of the loom with a portion of the frame broken out and shows the arrangement of the weft cones and feed therefrom, Figure 6 is an enlarged fragmentary section taken on the line 6—6 of Figure 5 and looking in the direction of the arrows, Figure 7 is a partial plan of the loom with the center removed and shows the weft thread cutter and stop motion mechanism carried by the breast beam, Figure 8 is an enlarged detailed view of the selvage shuttle mounted on the hand rail, Figure 9 is a vertical section of the same taken through the hand rail, Figure 10 is a vertical sectional view taken on the line 10—10 of Figure 8 looking in the direction of the arrows, and in addition shows the main shed, the selvage shed, and heddles therefor, Figure 11 is a top plan view of the selvage shuttle, Figure 12 is a top plan view of a section of the cloth showing the manner in which the selvage edge is woven, Figure 13 is a top plan view of the needle, Figure 14 is a side view of the same, Figure 15 is a top plan view of the carrier, Figure 16 is a side view of the same, Figure 17 is a side view showing the carrier and needle in engaging relation and with the weft thread carried under the needle so that upon the separation of the thread and needle, the thread will be retained by the needle, Figure 18 is a horizontal section taken on the line X—X of Figure 1 and with the center broken out, Figure 19 is a diagrammatic view showing one cycle of operation of the lay, the selvage mechanism, the heddle operation to change the shed, and the reciprocatory movement of the needle and carrier.

In each of the figures of the drawings, like reference characters indicate like parts.

The loom has a frame 30, arches 31, dobby 32, pattern cylinder 32', breast beam 33, hand rail 34, lay 35, reed 35', swords 36 for carrying the lay and hand rail, temples 37', driving pulley 37 and shipper handle 38. These parts are arranged in the usual and customary manner and operate precisely the same as in the conventional loom. The pulley is mounted on the main drive shaft 42 and this shaft is mounted in suitable bearings 43 on each side of the loom frame.

Needle and carrier

Figures 13 and 14 show a needle 45 such as is adapted for use in this improved loom, and Figures 15 and 16 show a carrier 50, while Figure 17 shows the manner in which the needle and carrier cooperate at or near the center of the warp shed to lay the weft threads. The needle and carrier comprise the subject matter of a separate application, filed by the applicant herein on December 24, 1927, Serial No. 242,342.

The needle has a threaded shank 48 which is secured in the end of a rod 49 and the carrier also has a threaded shank 48 which is secured in the end of a rod 51. The mounting of the rods 49 and 51 on the lay 35 is identical so that the detailed mechanism for the needle only has been shown. This is found in Figure 18.

The rod 49 is suitably mounted between upper and lower slide bars 52 which are provided at the outer end with a suitable spacing block 53 and at the front or needle end with a spacing block 54 which has a bushing 56 in which the rod 49 is adapted to slide. This bushing may be replaced from time to time as the same wears, by removing the set screw and drawing the same over the needle. The rod is centrally located in the blocks 53 and 54 and on each side thereof there is a guide bolt 57 which is threaded into the block 54 and which is secured to the block 53 by means of nuts 58 for properly spacing the said blocks. The outer end of the rod 49 is mounted in a crosshead 62 by means of the pin 63 and one side of said crosshead extends outward from the slide bars 52 and is provided with a pivoted link 65 by which the crosshead may be moved along the guide bolts 57 between the blocks 53 and 54. This will be later explained.

The mechanism which includes the slide bars 52, the spacing blocks 53 and 54, the guide bolts 57 and the crosshead 62 is used in identical form except in a reverse direction with the rod 51 which carries the carrier.

These slide bars 52 are mounted on extensions on each end of the lay 35 and the needle and carrier extend toward the center of the loom and have a common center so as to insure their engagement when operating in the shed of the warp. The carrier 50 has bifurcated arms or fingers 69, as shown in Figure 15, and each finger is provided with a slot 70, as shown in Figure 16. The needle 45 has a lower lip 71 which is provided with a central recess 72 extending a short distance inward from the end of the same and said needle has an overhanging shoulder 73. Extending from the center of this shoulder is a hook 74 and the retracted end of this hook lies within the recess 72 on the lower lip 71 and its point is positioned with a small space around the same to permit the weft thread to pass thereunder when engaged by the carrier.

Needle and carrier operating mechanism

The lay 35 is reciprocated by a link 75 connecting a crank 75' on the main shaft 42 as shown in Figure 3. Secured to the left hand extension of the lay is a bracket 76 which has an adjustable link 77 turnably mounted thereon. The other end of the link 77 is secured to the short arm 78 of a bell crank 79. The long arm of this bell crank is connected with a link 81 which in turn connects with a pin 82 secured to the short arm of a bell crank 83 and which said bell crank is swingably mounted on a bracket 84 secured to the frame member 86.

The bell crank 83 has its long leg connected to a lever 87 through a link 88 and the lever 87 is pivoted at a point 89 near its lower end to an arm 91 which is swingable on the pin 92 secured to the frame member 93.

A brace member 94 is connected to the arm 91 and to the frame member 86 and normally abuts against a pin 96 which is secured in the frame member 93. A tension spring 97 is secured to the lower end of the lever 87 and to a bracket 98 attached to the frame member 99.

The upper end of the lever 87 is connected to the crosshead 62 by the link 65. This is the crosshead which carries the rod 49 which has the needle 45 secured to its inner end and the crosshead is reciprocated by the lever 87 to move the needle back and forth through the shed of the warp threads.

The lever 87, arm 91, link 94, pin 96, and spring 97 cooperate and constitute a lost motion mechanism which is operated by the bell crank 83 whose long leg is connected by the link 88 to the lever 87.

Operation of the needle and carrier mechanism

When the lay 35 is reciprocated, the link 77 which is connected to the extension on the lay and to the bell crank 79, will operate said bell crank which in turn will operate the bell crank 83 through the connecting link 81. The crank 83 will reciprocate the link 88 which is connected to the lever 87. Each cycle of operation of the lay 35 will then cause one complete reciprocation of the link 88 and of course the lever 87. This will cause a complete reciprocation of the needle which is actuated by the lever 87. However, it is necessary to have a dwell during this reciprocation or cycle of operation of the needle in order to allow the selvage mechanism to operate. This period of dwelling was accomplished in the prior application above referred to by the dwell portions 78 shown in the drawings of that application in Figure 3. With the present mechanism, however, the dwelling is accomplished by the lost motion mechanism before mentioned. The operation of this mechanism can best be understood when described in connection with the diagram which is shown in the drawings as Figure 19.

Let us consider that the lay is in its forward position when the loom is started. The position of the mechanism marked "Start" in Figure 19 corresponds to this starting point. The lay has just beaten the weft into the fell of the cloth and is in its forward position. The link 88 has moved the lever 87 to the right and to its extreme position and is about to move toward the left. As the link 88 thus moves toward the left, the lower part of the lever 87 is pulled toward the left by the spring 97. This action will continue until the bracing link 94 abuts the stop pin 96. The lay has then moved the first 90° of its cycle, the heddles have changed, and the needle has been dwelling because the upper part of the lever 87 was at rest at the position shown in Figure 4 and its lower end only has moved.

The lower part of the lever 87 has now come to rest, and the long arm of the bell crank 83 is now in exact vertical position and continues to move and passes to the left of this vertical position an amount equal to the movement just described. During this movement, the upper part of the lever 87, which is now fulcrumed at 89, moves the needle all the way in to the center of the shed of the warp. This corresponds to the second 90° motion of the lay cycle. At this point the lay is in its rear position.

The lay now starts to move forward, the long arm of the bell crank 83 moving toward the right and when it reaches a vertical position, the lever 87 is still moving on the fulcrum 89 and will have withdrawn the needle from the shed. This constitutes the third 90° in the cycle of operation of the lay.

The crosshead 62 now abuts the block 53 on the extension of the lay 35 when the needle is withdrawn so that as the long arm of the bell crank 83 continues its motion towards the right, past its vertical position, the upper end of the lever 87 can no longer move, but its lower end is now positioned toward the right against the tension of the spring 97 so that the bracing link 94 and arm 91 pivoted at 92 will move with it to the position shown in Figure 4. This completes the cycle of operation of the lay.

During the final 90° of operation just described, the needle was dwelling, there being no motion on the upper part of the lever 87 and the selvage mechanism (later described) was operated.

The needle and carrier move in unison toward and away from the center of the shed. This is accomplished by connecting the crosshead 62 and the corresponding crosshead 62' on the carrier rod 51 to a roller chain 100 by means of suitable brackets 101 and 102; the crosshead 62 carrying the needle rod being connected to the upper part of the roller chain, as shown in Figure 1, and the crosshead of the selector being connected by the bracket 102 to the lower part of the roller chain.

This chain extends across the front of the lay 35 and is free to move over pulleys or sprocket wheels 103 and 104 secured to the extreme ends of the lay extensions.

*Selective mechanism for weft threads*

On the right hand side of the loom frame, as viewed from the front thereof, a platform 108 is suitably mounted and this platform is provided with a plurality of uprights for supporting any required number of cones 109 which carry the weft threads. These cones are arranged in rows and the cones of each row are staggered in relation to the cones of adjacent rows and each row is provided with an arched thread guide 111 over which the thread from the cones is drawn. These thread guides may be of different heights to insure that there will be no interference between the threads of the several cones. The weft threads which are drawn from the cones pass through eyelets in the guide plate 112 which is positioned vertically between the arches 31 and after passing through these eyelets, the weft threads pass through eyelets in the guide plate 113 and through eyelets in the guide plate 114, both of which latter named guide plates are horizontally disposed.

After the weft threads have passed through the guide plate 114, they pass through a vertical guide plate 115 which is secured to the loom frame and these threads pass through said guide plate horizontally and each of the same pass through an eyelet 117 in an individually operated heddle 118. The weft threads then pass through a wire guide 119 and from thence to the selvage edge on the right hand side of the cloth C.

The heddles are suitably secured from above heddle straps 121 which in turn are connected to jack wires which pass over pulleys 122 and are each connected with their respective jack 123 which is operated by the dobby 32 through the pattern chain 124 on the pattern cylinder 32'. The heddles are connected at their lower ends with long helical springs 126 which are in turn connected to the base of the machine or floor 127.

By reference to Figure 6, and assuming that there are eight different colors of weft threads on the cones shown on the platform 108, several of the heddles will be in their lowered position, as shown to the right, and one of the heddles containing the selected color will be drawn upward, as shown on the left. These threads pass in close proximity to the right hand side of the shed formed by the warp threads which have been designated as 128 and 129, and the selected weft thread 131 will lie directly in the path of the carrier 50 and against the fingers 69 of the carrier which act as a stop or limit to the upward movement of the selected thread.

It will, of course, be understood that the selection of the single weft thread, one of which is shown in position to be engaged by the carrier, and which thread has been designated by the numeral 131 in Figure 6, will be controlled entirely from the pattern chain acting through the dobby which operates the required jack to raise the heddles carrying the selected color or thread. The other seven threads (in this particular instance where eight colors are shown) will be disposed below the path of travel of the carrier and, consequently, will remain idle and in that position until such time as one or another of the same is selected for the weft by the pattern chain.

The wire guide 119 has its looped end disposed at an angle, as shown in Figure 5, in order to draw the weft threads close together to confine them within a small area so that they can be readily engaged by the carrier when selected and elevated to a position to be engaged thereby and where they will, when drawn upward, bear directly against the fingers 69 of the carrier 50.

The platform 108 may be of any desired size to support a number of cones, and consequently, the number of colors of weft threads which may be employed in a single pattern of cloth woven by this improved loom may be greatly advanced over the conventional loom.

*The stop motion mechanism*

The main drive shaft 42 has secured thereto a pinion 125 which meshes with a gear 130 secured to a stub shaft 135. This stub shaft has fixed thereto a cam 132 which actuates a bell crank 133 and the upper end 134 of the short leg of said bell crank extends into a recess 136 on the latch 137. This cam 132 is so shaped that it will provide two actuations of the bell crank for each revolution of the shaft 135.

The latch 137 is pivotally mounted on the inner end and between the open sides of the slide 138 and at the inner end thereof by means of a pivoting screw 139. The screw is securely fixed in the latch which tilts when the screw is turned. This pivoting screw extends outward from the right hand side of the slide and the knife 141 is securely fixed thereon by means of suitable lock nuts. This slide is mounted on the breast beam 33 between suitable guides 140 and is provided with a recess 142 near its outer end and into which the end of a rocker arm 143 extends. This rocker arm is secured at its other end to a shaft 144 which extends across and is journaled in brackets 146 on each side of the loom. This shaft is provided on the end opposite to that on which the rocker arm is fixed, with a lever 147 which extends through a slot in the breast beam. (See Figure 7).

The recess 136 in the latch 137 provides a rear wall 148 which is intermittently raised by weft threads, to the position shown in Figure 3, so that the upper end 134 of the bell crank travels in the recess 149 in the slide when the latch is tilted to raise the back wall 148 out of the path of the upper end of said bell crank as it is moved to and fro by the cam 132.

This device is for the purpose of stopping the mechanism in case a weft thread is not engaged by the carrier 50 and carried through the warp threads. Its absence permits the latch to remain stationary and its back wall is then engaged by the upper end of the bell crank.

Its operation is as follows:

In Figure 7 the needle is shown in its retracted position and the weft thread is engaged and held thereby. The weft thread is indicated by the numeral 131 and as the reed 35', carried by the lay and the hand rail, moves forward to beat the weft into the fell of the cloth, the weft thread is pressed against the knife 141 which tilts downward and lifts the latch 137, thereby raising the end wall 148 above the path of the upper end of the bell crank 134.

The cam 132 is so positioned on the stub shaft 135 that it will operate the bell crank to move the upper end thereof at the same instant that the weft thread 131 strikes against the knife 141 and tilts the latch upward to clear the path for the upper end of the bell crank so that it will pass unobstructed through the recess 149.

In case the weft thread is omitted for any reason, there is nothing to tilt the latch 137 so that upon the actuation of the bell crank 133 by the cam 132, the upper end 134 of said bell crank will strike against the rear wall 148 of the latch and will move the slide and latch outward, thereby rocking the rocker arm 143 and rotating the shaft 144 which in turn rocks the lever 147 causing it to strike against the pivoted trip 152 and move the shipper handle 38 out of its locking groove 153 whereupon said shipper which is formed of spring metal, will spring outward and stop the loom.

Selvage weaving mechanism

It will be understood that the tilting of the latch 137 and knife 141 will have a fixed limit and when that limit has been reached, the beating of the weft thread into the fell of the cloth will assert such pressure on the weft thread to press it against the knife to sever it and disengage it from the needle, thereby leaving in each instance, two loose weft threads. It is, therefore, desirable that some form of binding be placed along this edge of the cloth and to accomplish this purpose, a selvage weaving mechanism is applied to the loom.

Figures 8, 9 and 10 show the arrangement of this selvage mechanism which is mounted on the hand rail 34. The hand rail is provided at its upper end and at the side nearest the stop motion with a slot 154 which extends into a longitudinal recess 156. Within this recess is a sliding rack 157 which is reciprocated by a pin 158 extending through the slot 154.

On the bottom of the hand rail are a pair of shuttle guides 159 and 161 which are so positioned that the desired number of warp threads (in this case eight) are in line with the space between the same. The shuttle guides fit in the slots 162 and each of the same have a pair of pinions 163 which mesh at all times with the rack 157 which is located at their upper ends and their lower ends extend into longitudinal slots or runways 164 in the lower part of said guides. The pinions of the guides 159 and 161 alternately mesh with the rack 166 on the shuttle 167 which is passed to and fro by the operation of said pinions by the rack 157.

The selvage shuttle is shown in Figure 11 and has an arch 165 in which a spool of thread 160 is rotatably mounted. This selvage shuttle is completely described in the application above referred to, Serial No. 242,342, filed December 24, 1927.

Mechanism for operating the selvage shuttle

The frame is provided with a pin 168 (see Figure 2), to which the outer end of a swinging lever 169 is pivoted. This lever is adapted to be engaged by a cam 170 fixed to the stub shaft 135. This lever is pivotally connected at its front end by a suitable connection to a link 173 which is in turn connected to a rocker arm 174 pivotally mounted on the pin 176 extending out from the lay 35. This rocker arm besides having the old ogee offset 177, as shown in Figure 2, extends horizontally, as shown at 178, to engage with the lever 169.

The upper end of the rocker arm 174 is fastened to a bar 179 which is in turn pivotally mounted at 181 to a collar 182 on the pin 158 so that the rack 157 is reciprocated by the action of the cam 170. The shuttle guides 159 and 161, as before stated, are positioned so that the space included between the same, corresponds with the width of the selvage to be formed. In the present instance, the selvage is formed by using eight warp threads but of course, the number is optional. However, for the purpose of convenience, the operation will be described in connection with the use of eight warp threads.

The warp threads which are to be used for forming the selvage are not carried by the main heddles but the alternate threads are carried in two separate selvage heddles 183 and 184 which are separately carried by the selvage beams 186 and 187, respectively. These beams are pivotally mounted at their inner ends on a bar 188 secured to the front arch and the heddles are operated from the jacks 123 by means of jack wires 139 passing over idle pulleys 191 carried on a bracket 192 which is secured to the front arch, and these jack wires are fastened to said heddles intermediate their ends and are alternately raised and lowered.

Figure 10 will serve to illustrate the manner in which the selvage shuttle is operated in the auxiliary shed. The main shed is represented as formed by the warp threads 128 and 129 and half of the selvage warp threads are alternately raised and lowered so that the raised threads which are indicated by the numeral 193 will, with the raised warps 128, form an auxiliary shed through which the selvage shuttle passes each time a weft strand is fed through the main shed. Of course, the weft thread also passes through the auxiliary shed and weaves through the warp threads forming the same.

The jacks which operate the selvage heddles are controlled by the pattern chain through the dobby, in the same manner that the main heddles are controlled, and the selvage heddles are operated to lower one group of warp threads and raise the other group sufficiently higher than the raised warps of the main shed each time a new main shed is formed for receiving a weft thread.

Of course, the selvage heddles could be operated by cams on the main drive shaft.

Figure 12 illustrates a section of the cloth and shows the manner in which the selvage edge is woven. This has been, it is believed, adequately described in the co-pending application above referred to.

Operation of the loom

Assuming that it is desired to have a cloth having a pattern which involves eight weft colors, the cones containing the required colors are placed upon the uprights on the platform 108 and the threads therefrom are drawn through the eyelets in the guide plate 112, thence through the eyelets in the guide plates 113, 114, and 115, and thence threaded through their respective heddles 118, thence through the wire guide 119, thence between the lay 35 and the hand rail 34, and their ends are attached to the edge of the cloth or warp in any suitable manner, such as by tying.

Assuming that the warp threads (which may be single or double, as shown) have been threaded from the warp beam through the eyelets of their respective heddles and the pattern chain has been placed upon the pattern cylinder, the machine is now ready for operation.

In following the operation of the machine, reference may be had to Figure 19 which shows the operation of the needle and selector, the operation of the selvage mechanism, and the operation of the heddle changes to provide the successive warp threads.

Considering then that the machine is in the position marked on Figure 19, "Start", the shipper handle 38, which is formed of spring metal, is pushed toward the warp until it rests in the locking groove 153 on the breast beam 33. This action shifts the belt on the pulley 37 so that the main shaft 42 is set in motion and through the medium of the pinion 125 and gear 130, the stub shaft 135 is also set in motion.

The lay 35 being at its foremost position as shown in Figure 3, the lever 87 which drives the crosshead 62 is in its retracted position and by reason of the roller chain 100, the crosshead 62 which carries the carrier is also in its retracted position. As the main shaft 42 operates, the crank 75′ will pull the lay 35 rearward through the medium of the link 75 in order to operate the lost motion mechanism previously described under the heading of "Operation of the needle and carrier mechanism".

Previous, however, to the movement of the carrier and needle, the pattern chain has operated one of the heddles 118 and has raised the weft thread of the selected color to a position directly in line with the path of travel of the carrier and resting beneath the lower side of the fingers thereof, and the carrier will, upon actuation, carry the selected thread to the approximate center of the shed and deliver it to the needle which has moved to that point simultaneously with the said carrier during the second 90° shown in Figure 19. The engagement of the carrier and needle and the manner of delivering the thread from the former to the latter is illustrated in Figure 17.

Passing on to the third quarter or 90° of the cycle, the needle 45 and the carrier 50 are being retracted from the shed and the link 94 of the lost motion mechanism continues to rest against the pin 96 on the frame member 93.

During the fourth quarter or last 90° of the cycle, the needle is completely out and dwelling as the lost motion mechanism operates to move the lever 87 into the position shown in Figure 4.

During this quarter of the cycle, however, the selvage shuttle is operated through the auxiliary selvage warp in order to lay a selvage stitch immediately behind the weft thread which is still retained by the needle. As soon as the needle 45 has been fully retracted, which occurs at the beginning of the last 90°, the lay 35 and hand rail 34 carrying the reed 35′ are swung forward on their swords 36 in order to beat the weft into the fell of the cloth.

The weft thread thus pushed forward will strike against the knife 141 and tilt the same to raise the latch 137 so that the bell crank end 134, operated by the cam 132 on the stub shaft 135, will pass under said latch and within the recess 149 in the slide 138.

When the knife is tilted to its fixed limit, the pressure of the weft thread against the same will sever the thread and release it from the needle and the weft threads will be beaten into the fell and the loose ends thereof will, however, extend from the edge of the woven cloth.

During the time that the reed is beating the weft threads into the fell, the lost motion mechanism is operating so as to push the lower part of the lever 87 outward by the link 88 connecting with the long arm of the bell crank 83 so that the stop bar 94 is pushed away from the pin 96 and into the position shown in Figure 4.

At the end of the complete cycle and beginning the first quarter of the next cycle, the lay 35 will again operate the lost motion of the lever 87 by bringing the limiting bar 94 downward toward the pin 96 and during this quarter of the cycle, the heddles will change to provide another shed for the introduction of a selected weft thread, as before described.

Of course, the loom and particularly the needle and carrier operating mechanism illustrated may be modified and changed in various ways without departing from the invention herein set forth and hereafter claimed.

The invention is hereby claimed as follows:

1. In a loom having a lay and means for providing successive warp sheds, means for carrying a weft thread through each of the sheds so provided, and lost motion mechanism connecting said weft carrying means and said lay whereby the former is operated by the movement of the latter.

2. In a loom having a lay and means for providing successive warp sheds, a needle and a carrier for carrying a weft thread through each of the sheds so provided, and lost motion mechanism connecting said needle and carrier and said lay whereby the needle and carrier are operated by the movement of the lay.

3. In a loom having a lay and means for providing successive warp sheds, a plurality of weft threads in selective arrangement, means adapted to carry a selected weft thread and present a transverse portion thereof, means to receive the same therefrom, means connecting said last two means for simultaneously operating the same, and means operated by the lay of the loom for reciprocating said second means whereby a selected weft thread is carried by said two means through the warp shed.

4. In a loom having a lay and means for providing successive warp sheds, a plurality of weft threads in selective arrangement, means adapted to carry a selected weft thread and means to receive the same therefrom, means connecting said last two means for simultaneously operating the same, and lost motion mechanism operated by the lay of the loom for operating said second means whereby a selected weft thread is carried by said two means through the warp shed.

5. In a loom having a lay and means for providing successive warp sheds, a plurality of weft threads in selective arrangement, a carrier adapted to carry a selected weft thread and a needle to receive the same therefrom, means connecting said carrier and needle for simultaneously operating the same, and lost motion mechanism operated by the lay of the loom for operating the needle whereby a selected weft thread is carried to the center of the warp shed by the carrier and taken therefrom and carried through the shed by the needle.

6. In a loom having a lay and means for providing successive warp sheds, a plurality of weft threads in selective arrangement, means adapted to carry a selected weft thread and means to receive the same therefrom, a roller chain connecting said last two means for simultaneously operating the same, and lost motion mechanism operated by the lay of the loom for operating said second means whereby a selected weft thread is carried by said two means through the warp shed.

7. In a loom having a lay and means for providing successive warp sheds, a plurality of weft threads in selective arrangement, a carrier adapted to carry a selected weft thread and present a transverse portion thereof, and a needle to receive the same therefrom, a roller chain connecting said carrier and needle for simultaneously operating the same, and means operated by the lay of the loom for reciprocating the needle whereby a selected weft thread is carried to the center of the warp shed by the carrier and taken therefrom and carried through the shed by the needle.

8. In a loom having a lay and means for providing successive warp sheds, a plurality of weft threads in selective arrangement, a carrier adapted to carry a selected weft thread and a needle to receive the same therefrom, a roller chain connecting said carrier and needle for simultaneously operating the same, and lost motion mechanism operated by the lay of the loom for operating the needle whereby a selected weft thread is carried to the center of the warp shed by the carrier and taken therefrom and carried through the shed by the needle.

9. In a loom having a lay and means for providing successive warp sheds, a plurality of weft threads in selective arrangement, of extensions on each end of the lay and slides mounted thereon, a crosshead operating in each slide, one carrying a needle and the other carrying a carrier, means operatively connecting said crossheads for providing simultaneous movement of the carrier and needles into and out of the warp shed, and means connecting one of said crossheads and reciprocated by the lay to carry selected weft threads into the successive warp sheds.

10. In a loom having a lay and means for providing successive warp sheds, a plurality of weft threads in selective arrangement, of extensions on each end of the lay and slides mounted thereon, a crosshead operating in each slide, one carrying a needle and the other carrying a carrier, a roller chain operatively connecting said crossheads for providing simultaneous movement of the carrier and needle into and out of the warp shed, and means connecting one of said crossheads and reciprocated by the lay to carry selected weft threads into the successive warp sheds.

11. In a loom having a lay and means for providing successive warp sheds, a plurality of weft threads in selective arrangement, of extensions on each end of the lay and slides mounted thereon, a crosshead operating in each slide, one carrying a needle and the other carrying a carrier, means operatively connecting said crossheads for providing simultaneous movement of the carrier and needle into and out of the warp shed, and lost motion mechanism connecting one of said crossheads and operated by the lay to carry selected weft threads into the successive warp sheds.

12. In a loom having a lay and means for providing successive warp sheds, a plurality of weft threads in selective arrangement, of extensions on each end of the lay and slides mounted thereon, a crosshead operating in each slide, one carrying a needle and the other carrying a carrier, a roller chain operatively connecting said crossheads for providing simultaneous movement of the carrier and needle into and out of the warp shed, and lost motion mechanism connecting one of said crossheads and operated by the lay to carry selected weft threads into the successive warp sheds.

13. In a loom having a lay and means for